(12) United States Patent
Handley et al.

(10) Patent No.: US 7,933,470 B2
(45) Date of Patent: Apr. 26, 2011

(54) DARKNESS CONTROL USING PATTERN MATCHING

(75) Inventors: John C. Handley, Fairport, NY (US); André M. Blaakman, Pittsford, NY (US); Anthony P. Lanza, Webster, NY (US); Francis Kapo Tse, Rochester, NY (US); Xing Li, Webster, NY (US); Aron Nacman, Henrietta, NY (US); David J. Lieberman, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 187 days.

(21) Appl. No.: 12/139,865

(22) Filed: Jun. 16, 2008

(65) Prior Publication Data
US 2008/0247666 A1    Oct. 9, 2008

Related U.S. Application Data

(63) Continuation of application No. 10/878,693, filed on Jun. 28, 2004, now Pat. No. 7,406,210.

(51) Int. Cl.
*G06K 9/40*    (2006.01)
(52) U.S. Cl. ....................................... 382/274
(58) Field of Classification Search .................. 382/274
See application file for complete search history.

(56) References Cited

U.S. PATENT DOCUMENTS

| | | | |
|---|---|---|---|
| 5,231,580 A | 7/1993 | Cheung et al. | |
| 5,235,434 A * | 8/1993 | Wober | 358/448 |
| 5,408,329 A | 4/1995 | Mailloux et al. | |
| 5,434,629 A | 7/1995 | Pearson et al. | |
| 5,659,399 A | 8/1997 | Lin et al. | |
| 5,666,470 A | 9/1997 | Parker | |
| 5,687,297 A | 11/1997 | Coonan et al. | |
| 6,167,166 A | 12/2000 | Loce et al. | |
| 6,181,438 B1 | 1/2001 | Bracco et al. | |
| 6,243,499 B1 | 6/2001 | Loce et al. | |
| 6,297,889 B1 | 10/2001 | Loce et al. | |
| 6,711,306 B1 * | 3/2004 | Denber | 382/308 |
| 6,782,142 B2 | 8/2004 | Loce et al. | |
| 6,816,621 B1 | 11/2004 | Handley | |

OTHER PUBLICATIONS

Gersho, A.; Gray, R.M.; Vector Quantization and Signal Compression; c. 1992, Kluwer Academic Publishers; Norwell, MA, US; 0pp. 1-13, 307-517.
Loce, R.P.; Dougherty, E.R.; Enhancement and Restoration of Digital Documents, SPIE Press, 1997.
Loce, R.P.;Dougherty, E.R.; Enhancement of Digital Documents, Electronic Imaging Technology, SPIE Press 1999.
Loce, R.P.; Roetling, P.G.; Lin, Y.W.; Digital Halftoning for Printing and Display of Electronic Images, , Electronic Imaging Technology, SPIE Press, 1999.
Doughtery, E.R.; Sinha, D.; Computational Gray-Scale Morphology on Lattices (A Compararator-Based Image Algebra) Part 1; Real Time Imaging vol. 1, No. 1, 1995.
US Prosecution History For Issued Patent 7406210.

* cited by examiner

*Primary Examiner* — Vu Le
*Assistant Examiner* — Tsung-Yin Tsai
(74) *Attorney, Agent, or Firm* — Duane C. Basch; Basch & Nickerson LLP

(57) ABSTRACT

The present invention is a method and apparatus for processing image data to accomplish tuning or adjustment of images, so as to modify at least the darkness thereof, using compact, efficient methods and designs.

17 Claims, 10 Drawing Sheets

DARKNESS CONTROL USING PATTERN MATCHING

REFERENCE TO COPENDING APPLICATIONS

This application is a Continuation of U.S. application Ser. No. 10/878,693 filed Jun. 28, 2004, which is hereby incorporated by reference in its entirety.

Attention is directed to commonly owned and assigned copending applications, which are hereby incorporated by reference in their entirety:

"A METHOD FOR MINIMAL-LOGIC NON-LINEAR FILTER IMPLEMENTATION," John C. Handley, application Ser. No. 10/158,499, filed May 30, 2002 (D/994251); and "METHOD FOR GENERATING SHIFT-INVARIANT FILTERS," John C. Handley, application Ser. No. 09/561,609, filed Apr. 27, 2000 (D/99425).

FIELD OF THE INVENTION

The present invention is related to the digital image processing and, more particularly, to the software methods and programmable hardware for processing image data to accomplish tuning or adjustment of images, so as to modify at least the darkness thereof, using compact, efficient methods and designs.

BACKGROUND AND SUMMARY OF THE INVENTION

Heretofore, a number of patents and publications have disclosed methods and apparatus for the processing of digital images, and are hereby incorporated by reference for their teachings, the relevant portions of which may be briefly summarized as follows:

U.S. Pat. No. 5,408,329 "IMAGE ENHANCEMENT THROUGH DIGITAL DARKNESS CONTROL," Louis D. Mailloux, Fairport, N.Y.; Brendan C. Casey, Webster, N.Y.; application Ser. No. 08/941,828 filed Sep. 8, 1992, issued Apr. 18, 1995;

U.S. Pat. No. 5,659,399 "METHOD FOR CONTROLLING COMPACT DOT GROWTH," Ying-wei Lin, Penfield, N.Y.; Martin E. Banton, Fairport, N.Y.; application Ser. No. 08/565,138, filed Nov. 30, 1995, issued Aug.19, 1997;

U.S. Pat. No. 5,666,470 "METHOD AND APPARATUS FOR APPEARANCE TUNING OF BITMAP IMAGES," James D. Parker, Rochester, N.Y., application Ser. No. 08/496,556 filed Jun. 29, 1995, issued Sep. 9, 1997;

U.S. Pat. No. 5,687,297 "MULTIFUNCTIONAL APPARATUS FOR APPEARANCE TUNING AND RESOLUTION RECONSTRUCTION OF DIGITAL IMAGES," Bonnie R. Coonan, Rochester, N.Y.; Anthony M. Frumusa, Penfield, N.Y.; Aron Nacman, Penfield, N.Y.; Francis K. Tse, Rochester, N.Y.; Michael L. Davidson, Rochester, N.Y.; application Ser. No. 08/496,654, filed Jun. 29, 1995, issued Nov. 11, 1997.

U.S. Pat. No. 6,181,438 "METHOD AND APPARATUS FOR DIGITAL IMAGE DARKNESS CONTROL USING QUANTIZED FRACTIONAL PIXELS," Rosario A. Bracco, Webster, N.Y.; Michael Branciforte, Rochester, N.Y.; David C. Robinson, Penfield, N.Y.; James O. Mitchel, Rochester, N.Y.; Thomas Robson, Penfield, N.Y.; Robert P. Loce, Webster, N.Y.; Hoan N. Nguyen, Fountain Valley, Calif.; Hung M. Pham, San Gabriel, Calif.; Daniel D. Truong, Hawthorne, Calif.; Louis D. Mailloux, Webster, N.Y.; Cathleen J. Raker, Rochester, N.Y.; Sue K. Lam, Rochester, N.Y.; Robert R. Thompson, Jr., Harbor City, Calif.; Farhad D. Rostamian, Malibu, Calif.; Cheryl A. Pence, Cypress, Calif.; application Ser. No. 09/072,122 filed May 4, 1998, issued Jan. 30, 2001;

U.S. Pat. No. 6,297,889 "LOGIC-BASED IMAGE PROCESSING METHOD," Robert P. Loce, Webster, N.Y.; Michael Branciforte, Rochester, N.Y.; Ying-wei Lin, Penfield, N.Y.; application Ser. No. 09/218,688, filed Dec. 22, 1998, issued Oct. 2, 2001.

The following publications are also believed to represent the general nature of the digital image processing arts. Many techniques can be found in the arts, of which the following are representative and which are hereby incorporated by reference being made thereto. *Vector Quantization and Signal Compression*, A. Gesho and R. M. Gray, 1991 describes the use of a filter to assign one or more specific code-words to a given sample (e.g. vector quantization). A filter can also assign one or more tags to a center pixel or a new sample value to the center pixel in order to accomplish the overall goal of a restoration or enhancement of a degraded image, as taught by *Enhancement and Restoration of Digital Documents*, R. P. Loce and E. R. Dougherty, SPIE Press, 1997, and *Enhancement of Digital Documents*, R. P. Loce and E. R. Dougherty, Electronic Imaging Technology, SPIE Press 1999, and *Two-Dimensional Signal and Image Processing* J. S. Lim, Prentice Hall, 1990.

A filter may also be used to assign an array of fewer, more restrictive values to an observation (often referred to as either "quantization," "thresholding," or "dithering") as taught by *Digital Halftoning for Printing and Display of Electronic Images*, R. P. Loce, P. G. Roetling, and Y. W. Lin, Electronic Imaging Technology, SPIE Press, 1999. Other applications of filters used in signal or image processing include, resolution conversion, object detection, speckle-removal, and edge enhancement. Nonlinear image or signal processing is a general representation of signal or image filtering based on a logical decomposition of a filter into a set of relatively simple operators. Any windowed shift-invariant filter can be represented as a combination of simple operations called hit-or-miss transforms as taught by *Nonlinear Filters for Image Processing* E. R. Dougherty and J. Astola (eds.), SPIE/IEEE Press, 1999.

In accordance with the present invention, there is provided a method for processing a digital image to alter the darkness thereof, including the steps of: isolating regions of the digital image wherein said regions include a plurality of imaging areas, said regions including those suitable for altering the darkness thereof, and extracting image data therefrom for the pixels in at least one of said regions; using the extracted image data for said region, producing modified image data by modifying data associated with at least one pixel in the region to alter the darkness of said region; and merging the modified image with the digital image to produce an output digital image having at least one region in which the darkness of the image is altered.

In accordance with another aspect of the present invention, there is provided an apparatus for processing a digital image to alter the darkness thereof, including: windowing means for isolating regions of the digital image wherein said regions include a plurality of imaging areas, said regions including those suitable for altering the darkness thereof; memory for storing image data representing pixels in at least one of said regions; means for producing modified image data, using the image data stored in said memory, by modifying data associated with at least one pixel in the region to alter the darkness of said region; and digital circuitry for merging the modified image data with the digital image to produce an output digital image having at least one region in which the darkness of the image is altered.

One aspect of the invention deals with a basic problem in the processing and rendering of digital images. Digital office and production printers are expected to offer digital darkness, toner saver features, and line width control. To be competitive, these designs often support jaggie reduction and rendering techniques that impact xerographic development, such as line width control and compact dot growth. Such features are often enabled using an appearance tuning architecture. Previously, one of two approaches were used: (a) a massive, fixed appearance tuning design that operates upon a large (e.g., 49-pixel) context; or (b) a limited, programmable design that operates upon a small (e.g., 5-pixel) context. However, both of these approaches were incapable of solving problems with the image output terminal that were recognized late in the development cycle. The former was too inflexible while the latter too limited. Hence, it was often necessary to redesign, modify or limit the functionality of digital office and production printers.

This present invention is based on the discovery of techniques and apparatus designs that alleviate this problem—thereby providing a highly programmable and efficient image processing architecture that is able to handle a larger context (larger numbers of pixels). The technique enables the use and re-use of this image processing architecture across many digital office and production printers and related devices, thereby reducing costs.

The techniques and methods described herein are advantageous because they are cost efficient compared to other approaches, and make it unnecessary to have customized darkness control or similar image processing features that are tied to particular digital copying or printing devices. The present invention can be adapted to any of a number of image output terminals or devices. A wide variety of operations can be implemented using these techniques. Each technique can ensure that the image processing features desired, and tuned for the particular characteristics of the image output terminal, can be implemented. As a result of the invention, development time and cost may be significantly reduced while at the same time providing improved capability for image processing, particularly darkness control, for digital copiers and production printers.

Figure 1:
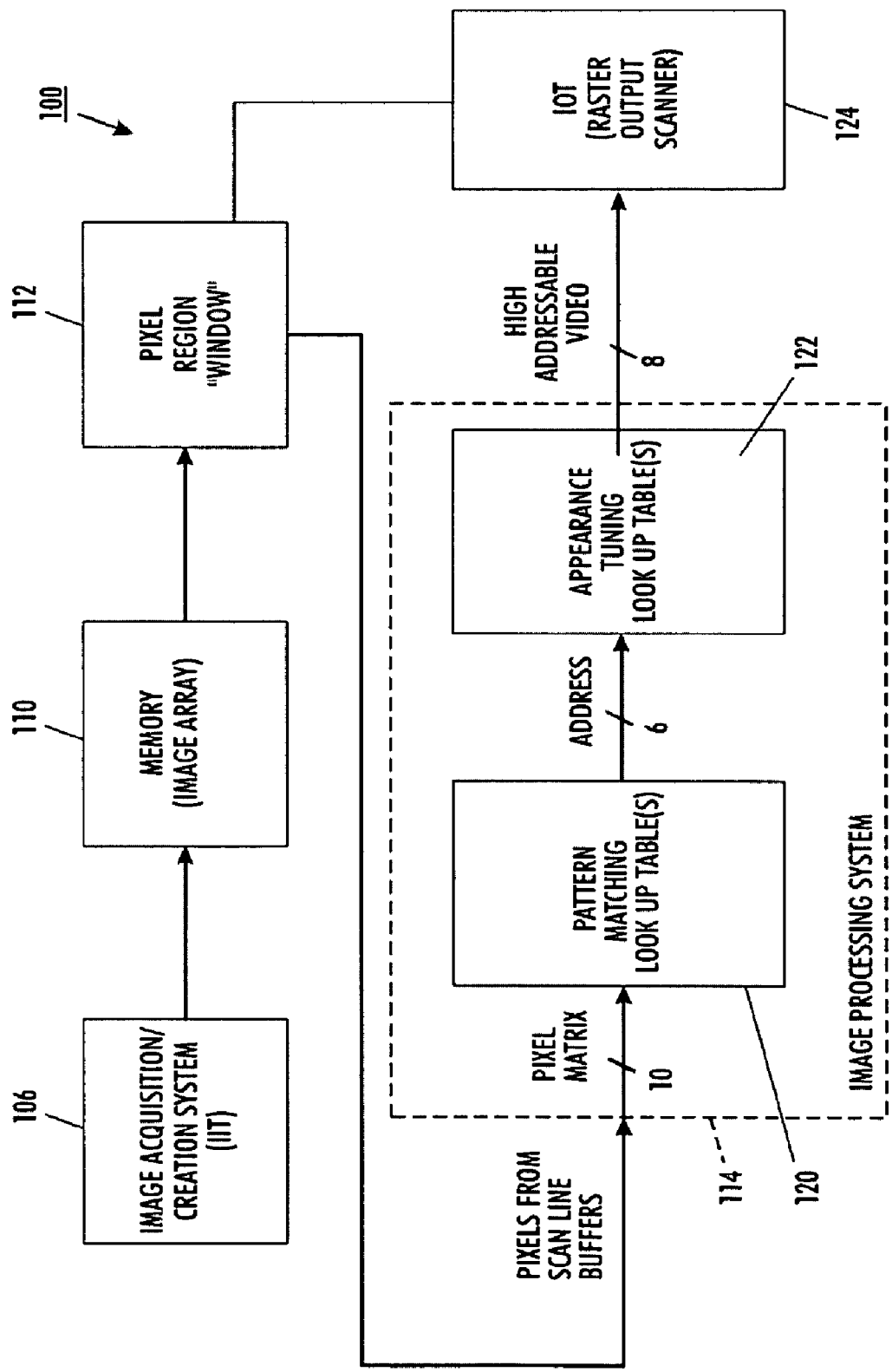
FIG. 1 is a block diagram depicting an embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

Figure 3:
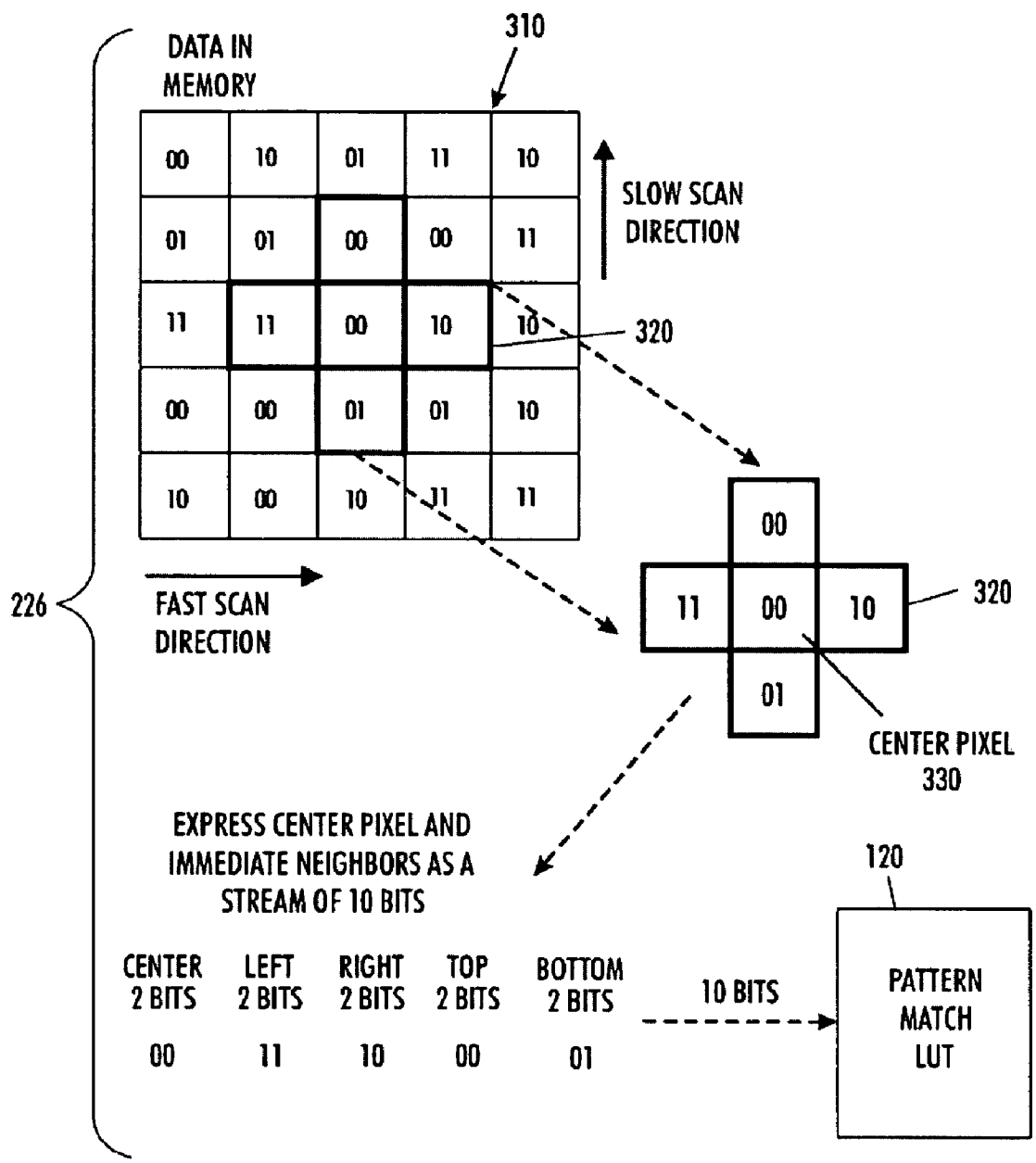
FIG. 3 is a an example of the processing of image data.

The term "data" refers herein to physical signals that indicate or include information, specifically including data defining pixels or imaging areas in a digital document or image. When an item of data can indicate one of a number of possible alternatives, the item of data has one of a number of "values." For example, an N-bit item of data has one of $2^N$ values, and an imaging area having N binary pixels has one of $2^N$ values (see e.g., imaging areas in region 310, FIG. 3 representing a 2× high-addressability area).

The term "data" includes data existing in any physical form, and includes data that are transitory or are being stored or transmitted. For example, data could exist as electromagnetic or other transmitted signals or as signals stored in electronic, magnetic, or other form.

"Memory circuitry" or "memory" is any circuitry that can store data, and may include local and remote memory and input/output devices. Examples include semiconductor ROMs, EPROMs, EEPROMs, RAMs, and storage medium access devices with data storage media that they can access.

Conventionally, the bits of a binary number are ordered in sequence from MSB to LSB or vice versa. As used herein, "left" and "leftward" arbitrarily refer to a direction toward an MSB in sequence while "right" and "rightward" arbitrarily refer to a direction toward an LSB in sequence.

An "address" or "index" is an item of data that can be used to address a memory cell or table entry within memory.

An "image" is a pattern of physical phenomena such as light, and may include or represent characters, words, and text as well as other features such as graphics. An image may be divided into "regions" or "imaging areas," each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each addressable location in an image may be called a "pixel." An "imaging area" will contain a plurality of pixels. In general, if an image has an asymmetric resolution and one dimension has a resolution M times greater than the other, then the imaging area would be a square-shaped region containing M pixels. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a region of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

Imaging areas are "neighbors" or "neighboring" within an image when there are no other imaging areas between them and they meet an appropriate criterion for neighboring. If the imaging areas are rectangular and appear in rows and columns, each imaging area may have 4 or 8 neighboring imaging areas, depending on the criterion used.

An "edge" occurs in an image when two neighboring imaging areas have sufficiently different values according to an appropriate criterion for the occurrence of an edge between them. The term "edge pixels" may be applied to the pixels contained in one or both of two neighboring imaging areas between which an edge occurs.

An "image input terminal" (IIT) is a device that can create, generate or receive an image and provide an item of data defining a version of the image. For example, a "scanner" is an image input device that receives an image by a scanning operation, such as by scanning a document. A personal computer workstation is an example of an IIT that may be used to generate an image using well-known graphics and image software. Similarly, a digital camera is another form of IIT.

An "image output terminal" (IOT) is a device that can receive an item of data defining an image and provide the image as output that is viewable. A raster output scanner (ROS) driven electrophotographic printer is an example of an IOT. A "display" is an image output terminal that provides the output image in human viewable form. The visible pattern presented by a display is a "displayed image" or simply "image."

Referring to FIG. 1, there is depicted a general schematic diagram of an embodiment of the present invention. In one embodiment, the present invention is employed as an apparatus 100 for processing a digital image generated by an IIT 106 to alter the darkness thereof. As illustrated in FIG. 1, the source of the digital image may be any IIT, where the image is passed to or stored in memory 110. Memory 110 may be suitable for the storage of the entire image or it may be designed to store only a portion of the image data (e.g., several rasters or fast-scan lines). More specifically memory 110 stores data that is representative of the imaging areas in the digital image.

The data may be extracted from the memory on a raster basis or on a pixel-by-pixel basis for use by the subsequent components or steps. More specifically, the pixel region window block 112, serves to select some or all pixels within a region of the image (accesses or extracts from memory 110), so as to make the data for the respective pixels available for processing. It will be appreciated that while described as a static system, the present invention is intended to continuously operate on pixel data in a "streaming" fashion, and that the window 112 may be any suitable apparatus or methodology that allows access to a plurality of pixels.

As described herein, "window" 112 is intended to represent windowing means for isolating regions of the digital image wherein the regions include a plurality of imaging areas, and the regions are suitable for altering the darkness thereof. In one embodiment, this windowing means may include a plurality of fast-scan data buffers, wherein each buffer contains a plurality of registers or similar memory cells for the storage of image data therein, with the data being clocked or otherwise advanced through the registers. The number of registers is dependent upon the "horizontal" (fast-scan) window size and/or line width, whereas the number of buffers is dependent upon the "vertical" (slow-scan) window size. As will be appreciated, the window size is dependent upon the context that is required to implement the particular image adjustment desired and the level of addressability of the imaging areas (higher levels of addressability will inherently result in more data stored to provide the required context). While one windowing means has been generally described, it will be appreciated that similar means may be implemented using hardware and/or software to point/access a memory device, so that data for selected imaging areas may be accessed, rather than having the data separately stored in a buffer. It will also be appreciated that alternative configurations may be employed for the buffer. For example, a single, long, buffer may be employed, where image data is simply clocked through the buffer. Thus the various alternatives all employ some form of memory for storing image data representing image areas in at least one region of the image.

As further depicted in FIG. 1, the image processing system 114 provides means for producing modified image data, using the image data stored in memory. The image processing system 114, as depicted in FIG. 1, serves to modify data associated with at least one area in the region to alter the darkness of the region. As represented, the modification is accomplished using pattern matching look-up table(s) 120 and appearance tuning look-up tables 122, the output of look-up tables 120 being passed to table 122. The output of table 122 is subsequently merged with the digital image to produce an output digital image having at least one region in which the darkness of the image is altered. Although not specifically depicted in FIG. 1, examples of the digital circuitry for completing the merge is illustrated in the following figures. Thus, the means for producing modified image data includes at least two look-up tables, wherein a first look-up table 120 identifies when image areas within the region match a predetermined, programmable pattern, and the second look-up table 122 receives an output from the first look-up table so as to generate output data suitable to drive an image output terminal or raster output scanner 124. As will be appreciated from the description below, the means for producing modified image data may include additional look-up tables, as well as storage and logic circuitry.

Figure 2:
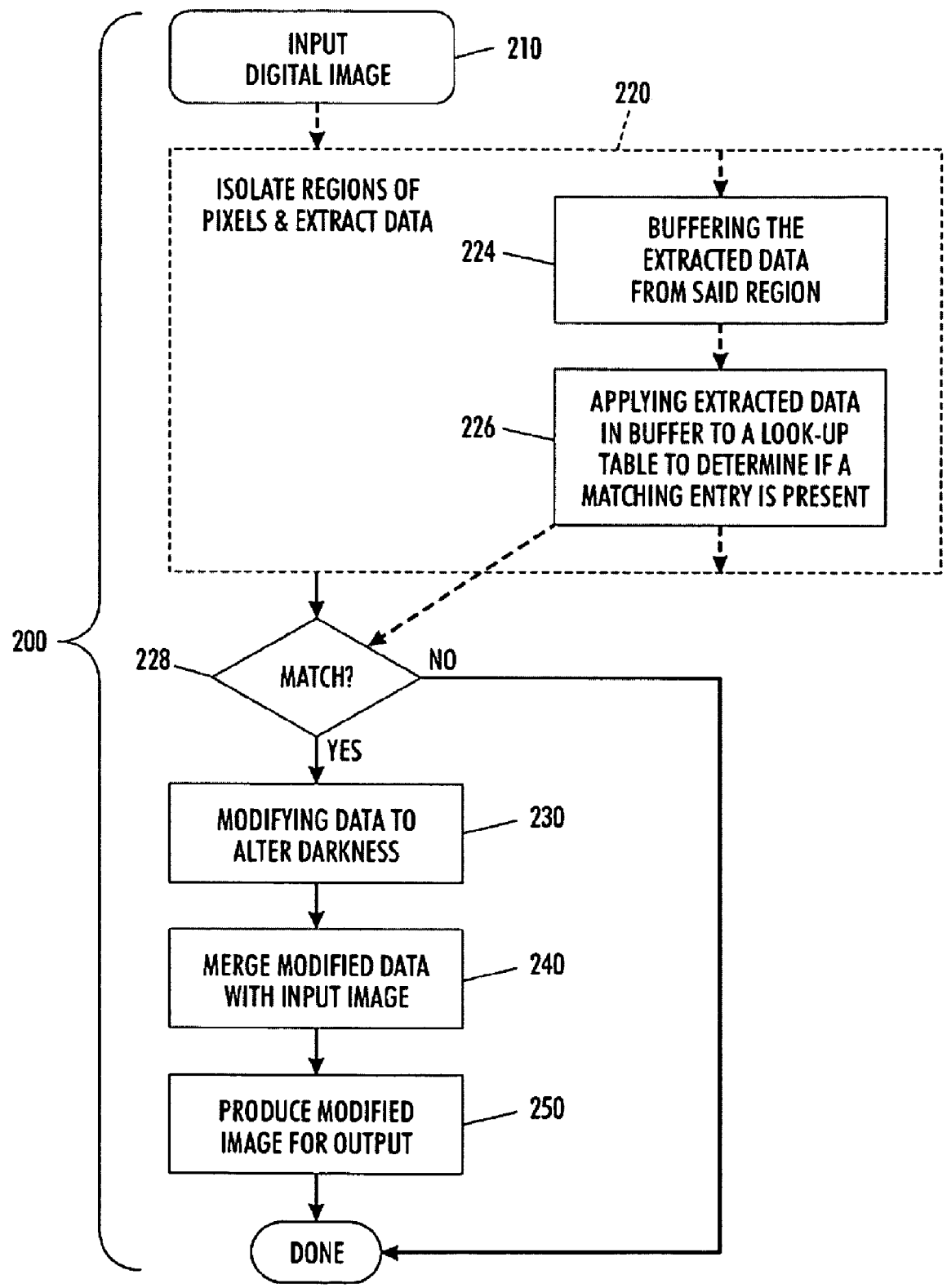
FIG. 2 is a flowchart illustrating the general steps performed in accordance with an aspect of the present invention.

Referring next to FIG. 2, there is depicted a generalized flowchart showing steps in accordance with the present invention. It will be appreciated, however, that the present invention contemplates the performance of various steps not specifically illustrated, but more particularly characterized by the components and data flow as will be described in the following figures. Method 200 is initiated in response to an input digital image as represented by step 210. The input image is then processed, as described relative to FIG. 1 above and as represented by step 220, where one or more regions of the image are isolated, and pixel data associated with image areas within said region are determined. More particularly, step 224 represents buffering of the extracted data from said region, and step 226 applying the extracted data in the buffer to a look-up table to determine if a matching entry, corresponding to the data, is present. In the event of matching data, step 230 operates to produce, using the extracted image data for said region, modified image data by modifying data associated with at least one image area in the region to alter the darkness of the region. Subsequently the data is merged with the input image data (for non-altered areas, step 240, and then an output digital image is produced, step 250, having at least one region in which the darkness of the image was altered.

In one aspect of the invention, the purpose is to detect an edge, or a transition in brightness, between the center image area of a window and any of its neighboring areas, and then to electronically manipulate the center area accordingly. The position of the center area relative to its neighboring areas is then adjusted in order to provide the brightness control for an image. For example, a gray center area between a black area and a white area, could be pushed toward the black area. This has the effect of growing the gray area and is known as Augmented Compact Dot Growth (ACDG). ACDG involves the repositioning of the center area only and is implemented when the lightness/darkness of the image is set to nominal. When the user requests anything other than the nominal lightness/darkness setting, then the center area may be appearance tuned. Appearance Tuning (AT) refers to the lightening or darkening of an image area in conjunction with its repositioning relative to neighboring areas. The input to the Pattern Match (PM) design consists of data from a pre-defined number of image areas, arranged in a fastscan (FS)×slowscan (SS) context. For illustration purposes we will consider a 3×3 context as shown in FIG. 3, but this PM design can be scaled to any number of M×N areas in a local area context (e.g., 5×5, 7×7, etc.).

Having described the general operation of the present invention, attention is now turned to specific aspects and embodiments of the present invention as illustrated in FIGS. 3-8E. As set forth in FIG. 3, which shows step 226 schematically, the pattern-matching step 226 described above is accomplished using a selected set of image areas 320 that form the "context" from a region 310. The selected set is illustrated as a "cross-shaped" window 320, however, it will be appreciated that alternative shapes and configurations may be employed in accordance with alternative embodiments of the present invention. More specifically, any of the possible shapes or combinations of pixels within an M×N region 310 may be used in accordance with the present invention.

Once the image areas are identified, the data associated with the areas is extracted as represented in window 320, buffered, and then used to create as a bit-stream or vector used as an index into the pattern match look-up table 120. The output of the pattern match look-up table is a similar digital signal, as illustrated in FIG. 1, and is employed, in accordance with an aspect of the present invention, as an index into an appearance tuning look-up table. In this manner, the step of producing modified image data is accomplished by modifying data associated with at least one area in the region/window to alter the darkness of the area and thereby the region. As illustrated in FIG. 3, the "target" image area for modification, may be center area 330, although other neighboring areas may be modified as well.

Figure 4:
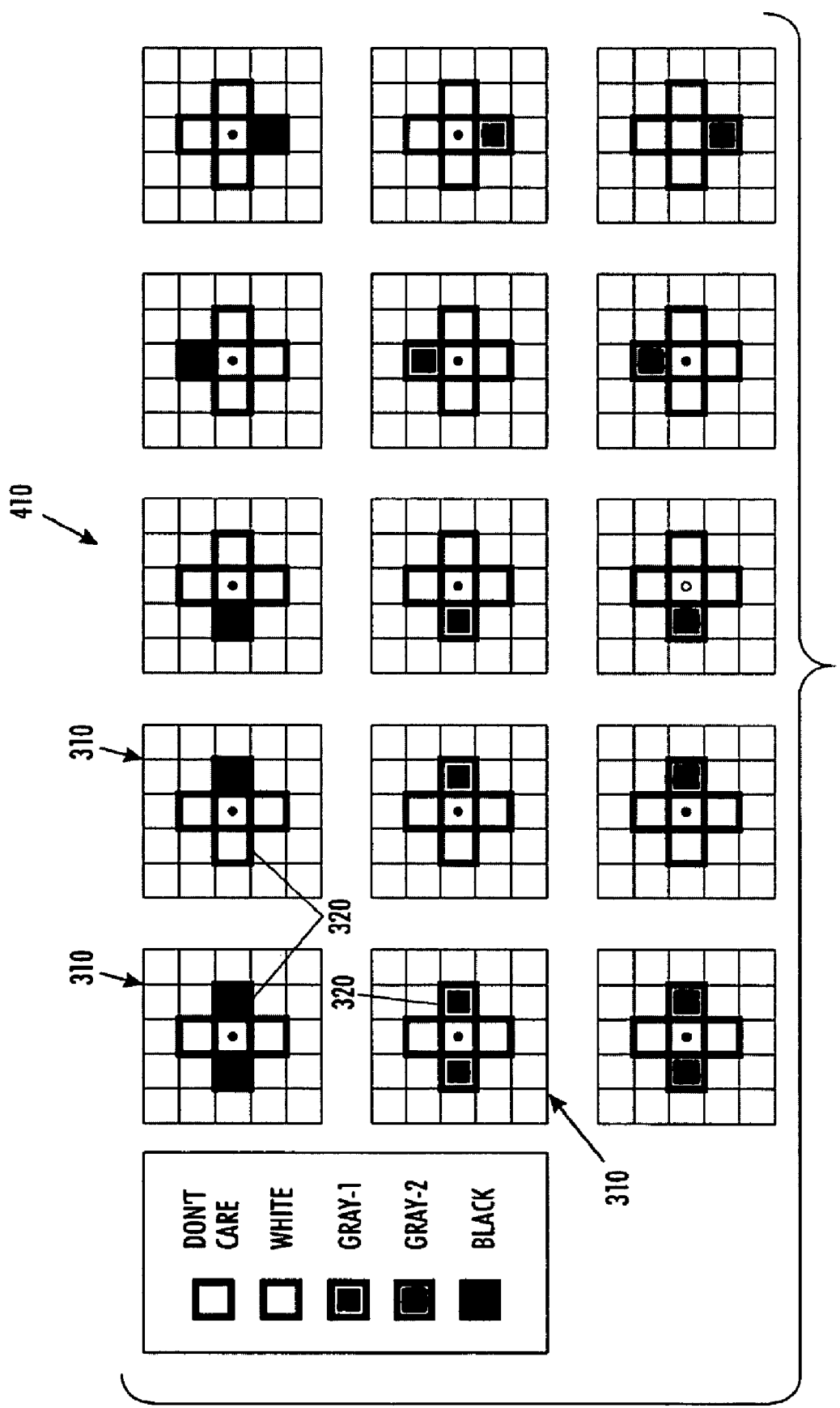
FIG. 4 is an exemplary illustration of various patterns and relative priorities of the patterns in accordance with an embodiment of the present invention.

FIG. 4 is intended to illustrate a series of possible patterns that may be programmed into look-up table 120. Although various other combinations are understood to be possible, the example of FIG. 4 illustrates a set of patterns 410, wherein each pattern is identified by a priority number above it. The legend for the image area "values" in FIG. 4 is set forth in the box at the bottom of the figure. More than one pattern may exist at the same time, so a priority is required. The pattern set represented by FIG. 4 is one of a possible set that has been subdivided into four subsets—since a 2-bit per image area center has four possible states. All of the patterns having a white (00) center area form the depicted subset while other subsets having a gray-1 (01) center area, a gray-2 (10) center area, or a black (11) center area are not illustrated.

Associated with every possible pattern within the Pattern Match LUT is a multi-bit (6-bit or other n-width) code that defines an address into another LUT. When the pattern is matched, the proper address is generated and indexed into the "Appearance Tuning" LUT, which may be combined in a common application specific integrated circuit. At each Appearance Tuning LUT address is stored a multi-bit value of data that describe the High Addressable width and positioning of the image processed area to be printed. This data may be delivered directly to the IOT such as a raster output scanner. Although prior designs of similar systems required the data to be sent to a PWPM (Pulse Width and Position Modulation) chip, where two bits of data defined the position of the pixel (right, left or center justified), in one embodiment of the current invention, no PWPM chip is used—the 8 bits of High Addressable data is sent directly to the ROS.

As illustrated in the embodiment depicted in FIG. 3 and the examples of FIG. 4, the present invention further includes a step of selecting only a subset of data from image areas in a region. Moreover, the system and method described use the extracted image data to produce a second modified image data by modifying data associated with at least one image area (e.g., the center area) in the region to alter the darkness of the region. And, in order to modify the image, when it is output, the altered data is combined or merged with the digital image to produce an output digital image having at least one region in which the darkness of the image is altered. As noted above, the darkness may be altered by either shifting the position of the output within an image area (compact dot growth), and/or by altering the area (appearance tuning).

As will be appreciated by those skilled in the art, the step of isolating regions of the digital image including those suitable for altering the darkness further includes buffering the extracted data from the region. The extracted data is represented as an N-bit value, and the relative order of bits in the N-bit value are prioritized in accordance with the position of their associated image areas relative to a center area. Moreover, the extracted data in a buffer may be applied as an index to a look-up table to determine if a matching entry, corresponding to the data, is present, where the look-up table has entries ordered in a manner representative of their priority (FIG. 4) for modification of the image data so that a relative priority is established for similar patterns based upon the order of the bits of data. It should also be appreciated that once the regions are isolated, and data used to determine an index into a matching look-up table, the output of the matching look-up table may be employed to generate an index address, and by using the index address to access an appearance tuning look-up table the modified output data may be generated to accomplish the lightening/darkening desired.

Although described above, and depicted in FIG. 1 as being directed to an image output device, it will be appreciated that, as with conventional printing systems, the step of outputting the modified data may be applied to a pulse-width, position-modulated output control to define the position and width of the modified pixel to be rendered. In such a system, a first plurality of bits in the modified data defines the position of the mark or dot that is exposed for output (e.g., left justified, right justified, center justified, or split and justified to left and right), where a second plurality of bits in the modified data defines the width of the mark.

As another aspect of the present invention, the look-up table 122 of FIG. 1 is preferably programmable, and the operation or selection of the table may be controlled in accordance with a particular processing mode of the image output terminal or ROS. For example, in a "darken" mode, an offset into the look-up table may be applied, or the selection of one of a plurality of multiplexed look-up tables may be accomplished by a bit(s) that is used to indicate the mode. Hence, the system and methods employed may enable adjusting the appearance tuning look-up table in accordance with a preferred processing mode, and the processing mode may be selected in accordance with a user-specified preference (e.g., lighten, darken, normal).

Figure 5:
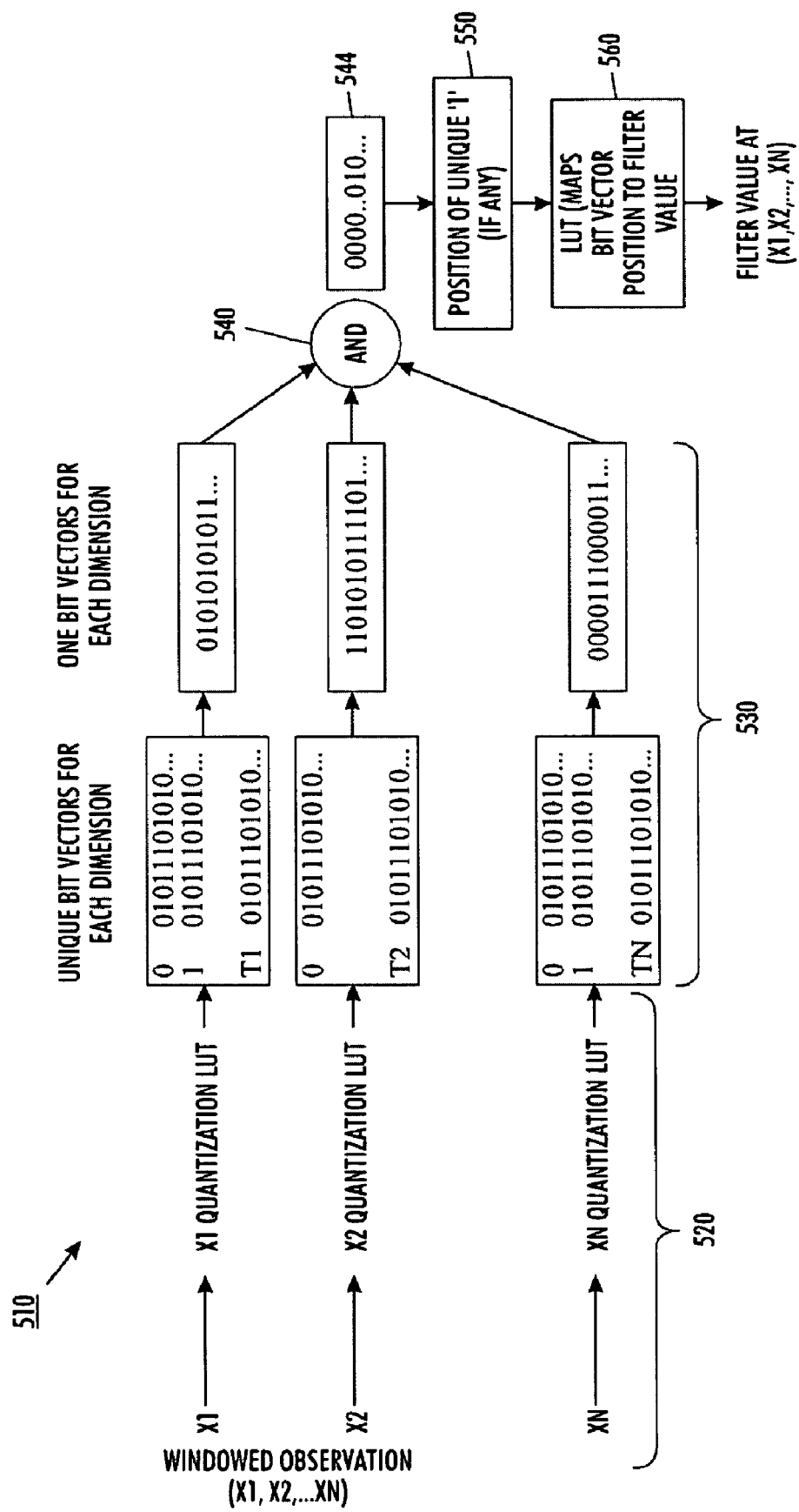
FIG. 5 illustrates the data flow and decision logic for a nonlinear filter in accordance with a technique of the present invention.

In one embodiment of the present invention, the previously described functionality may be accomplished using components as illustrated by the data flow diagram example 510 in FIG. 5. Each imaging area 520 in a gray-scale windowed observation is used to index a corresponding interval-label table. Each interval label is then used to index a corresponding bit-vector lookup table 530 (containing the minimal required unique bit vectors). All bit vectors are "ANDed" together at 540 to produce a single bit vector 544 with a unique nonzero entry. The position of the nonzero bit is retrieved as represented by block 550 and used to look up, in a table 560, a value for the center area. It will, however, be appreciated by those familiar with digital signal processing designs that memory requirements for this invention grow linearly as a function of window size and the length of the bit vectors, and bit vector lengths are dominated by the number of patterns to be matched.

Figure 6A:
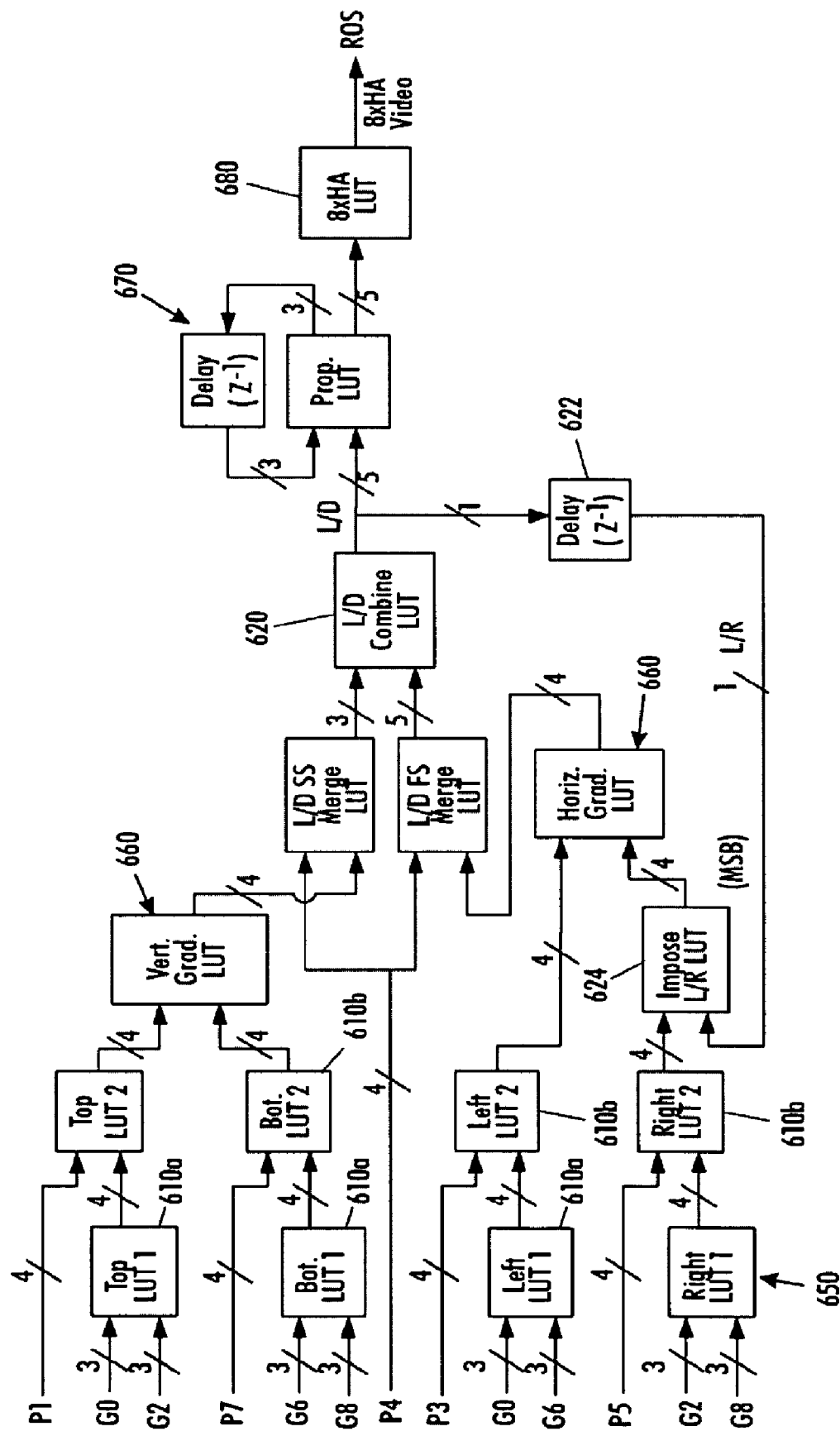
FIGS. 6A and 6B are block diagrams illustrating an alternative embodiment of the present invention.
Figure 6B:
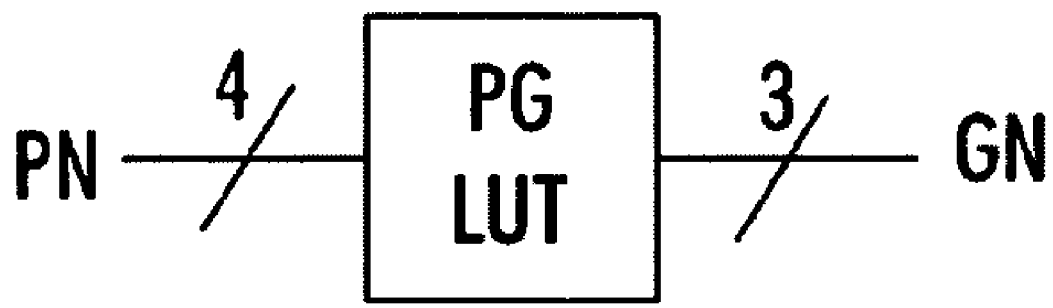
Figure 7:
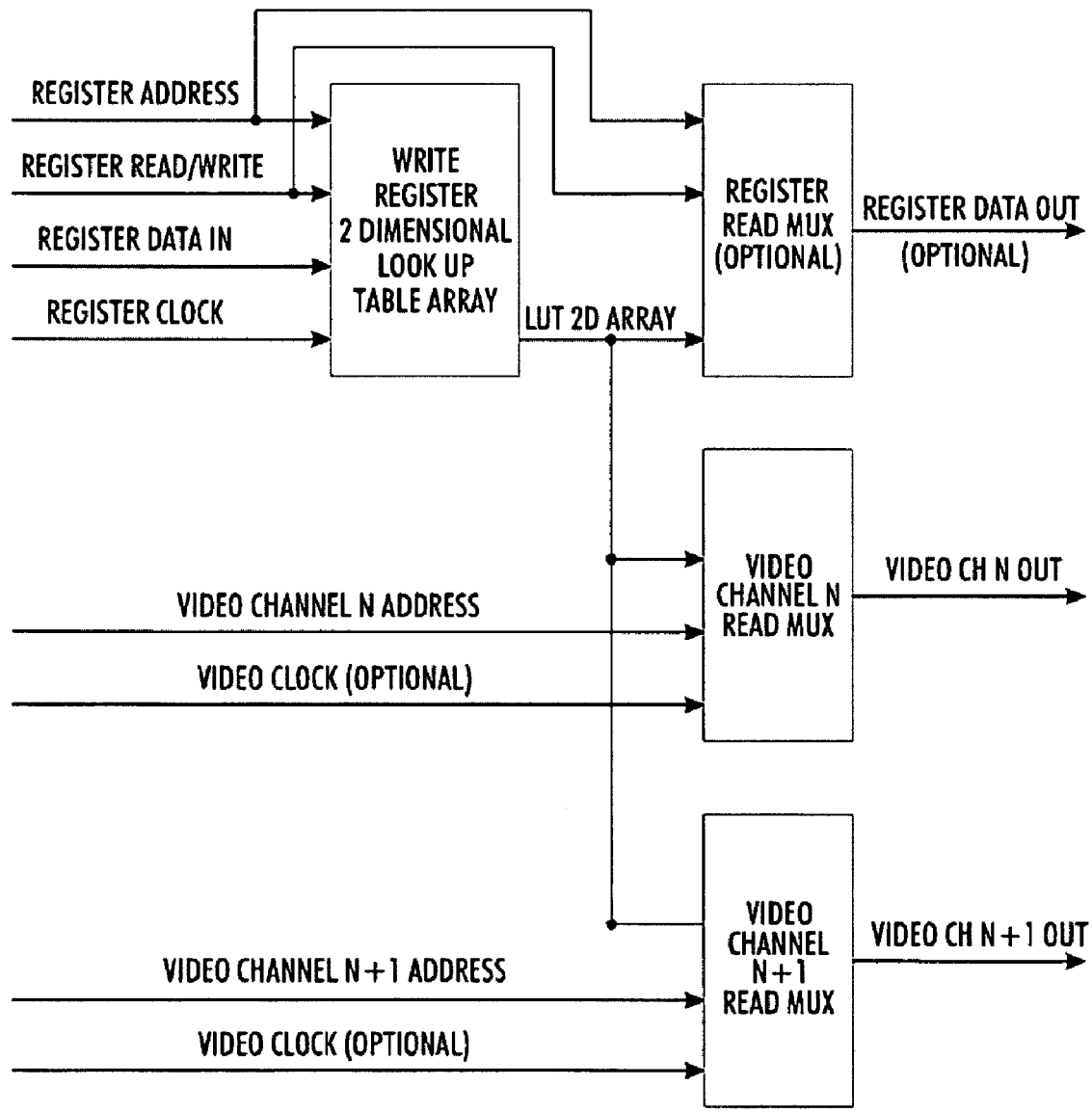
FIG. 7 is a block diagram illustrating the detail of an aspect of the look-up tables of FIG. 6A.

Turning next to FIGS. 6A, 6B and 7, depicted therein are yet another alternative embodiment of the present invention. The highly programmable appearance tuning design depicted in FIG. 6A operates upon a medium sized context and uses recursive feedback. This design has been shown to support darkness and toner saver control and supports higher resolution binaries. Depending upon the programming of the look-up tables, such a device would be capable of reducing jaggies and scatter artifacts, compensating for nonlinear xerographic development bias, and supporting recursive feedback which can be used to achieve improved compact dot growth. As a result, isotropy, repeatability, and robustness are improved.

The structure of the appearance tuning hardware illustrated in FIGS. 6A, 6B and 7 is a series of programmable look up tables 610 where the output (data) of one look-up table 610*a* becomes the input (address) of the next 610*b*. In this way the effect of a very large look-up table can be achieved with a much smaller number of gates in an ASIC than would be required for a large look-up table. The design is intended to reduce the number of possible combinations to those of interest without reducing the programmability of the device. A hard coded design also reduces the number of required gates but has the disadvantage of long development time and no flexibility to introduce improvements at a later date without a new ASIC. In one embodiment, the hardware implementation is accomplished so that the tables are loaded at the system level from a system controller that can retrieve the information from a disk drive, EEprom, or other system resource. Such a design can begin early and as new or improved algorithms become available the system can be upgraded by simply uploading new look-up table data without developing new hardware.

Another issue addressed by the embodiment depicted in FIG. 6A is the inability of a single look-up table to implement feedback across image areas or pixels. As illustrated in FIG. 6A, the value output by LUT 620 is delayed by one pixel, delay 622, and is then fed back to a previous LUT 624.

Each look-up table in FIG. 3 is implemented as a register array as shown in FIG. 4. In one ASIC implementation each look-up table has one write port and two read ports. If it is necessary to read back the table's contents to the control system then a third read port could be added. This third port is labeled "register read MUX (optional)" in FIG. 4. In this system the look-up table is loaded by writing to the "write register 2 dimensional look up table array" from an internal ASIC control buss synchronously with the control system clock. Once the array is written each element in the array is a static value that is available to read by addressing the read mux(s). The static array values can be read by addressing an output mux with input video or the control system address bus. In one system each look-up table is structured with two video read ports to support a dual beam ROS. Similarly, in a quad beam system there would be four read ports, one for each beam. This is possible because the look-up table data for each beam is identical and because the write register data is static once written.

The use of registers, versus using multi-port synchronous RAM, is believed preferable in order to implement the feedback functionality. In FIG. 6A there is feedback from the "L/D Combine LUT" 620 back to the "Impose L/R LUT" 624 through a one-clock cycle delay (Z-1) 622. This is only possible because the data flows through the tables in the chain; "Impose L/R LUT", "Horiz. Grad. LUT", "L/D FS Merge LUT", and "L/D Combine LUT" all in one clock cycle. This is done by not registering the data in the read mux's as is represented by the optional video clock pin on the read mux. With multi-port RAM the data and/or address is always registered causing a one-clock delay for each LUT in the chain making feedback impossible. When using small multi-port RAM in an ASIC many times the support test circuits required in addition to the RAM itself cancel the size advantage of using RAM over register implementations. In order to satisfy timing requirements, the present implementation registers the video at the "Top LUT 2", "BOT LUT 2", "Left LUT 2", and "Right LUT 2". With a faster ASIC technology this may not have been necessary.

As described with respect to FIGS. 6A, 6B and 7, it is apparent that certain of the general steps depicted in FIG. 2 may be implemented by a plurality of chained look-up tables to determine if a matching entry is present or isolating regions of the digital image and/or modifying a pixel in accordance with the identification of such a match. Moreover, it will be appreciated that several advantages are derived not only from the chained design of such look-up tables, but also from the programmability of such tables. In the described embodiment, the step of delaying an output of at least one look-up table prior to inputting the output into another look-up table facilitates feeding back information about the preceding dot adjustments. In this way, it is possible to achieve dispersed/clustered patterns and also enables filling a solid area with a variety of "textures".

Referring to FIGS. 6A, 6B and 7, it will be appreciated that the lookup tables may be divided into a first stage (FIG. 6B) where a pseudo-gray look-up table summarizes a plurality of corners (P0, P2, P6 and P8) of the region into pseudo-gray values (G0, G2, G6 and G8, respectively). Subsequently, a second stage 650 operates where top, bottom, left, and right look-up tables 610*a* summarize the binary patterns that surround a center imaging area (P4). A third stage 660 then receives the output of the second stage to compute at least one gradient, and the gradient data is merged with data representing the center area to produce a lightness/darkness signal. Finally, a state machine 670 is implemented in the form of a propagation look-up table, where the state of the machine is a function of the previous state and the output from the third stage to produce an encoded binary value. Ultimately, the design of FIGS. 6A and 6B operates to complete the step of sending an encoded binary value to a high-addressability look-up table 680 to produce a multi-bit binary output signal suitable for driving an output device such as a ROS.

Figure 8A:
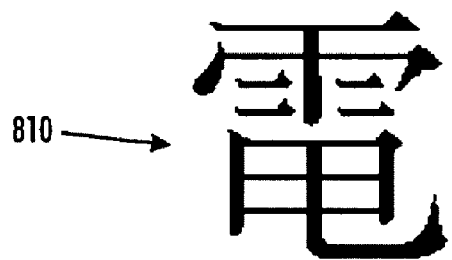
FIGS. 8A-8E are exemplary magnified illustrations of the impact of the present invention on a detailed text rendering operation.
Figure 8B:
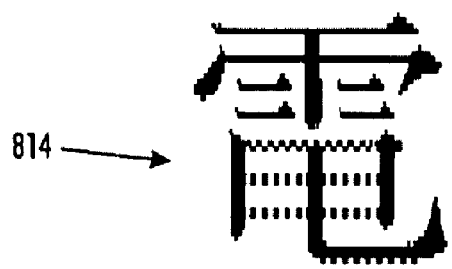
Figure 8C:
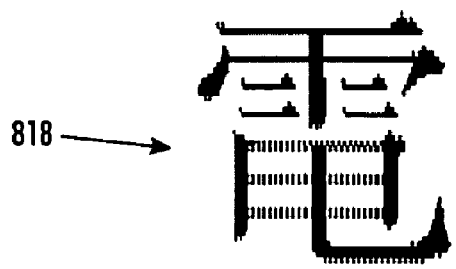
Figure 8D:
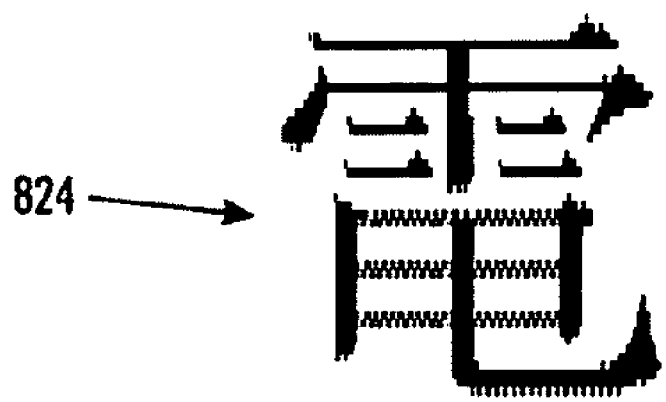
Figure 8E:
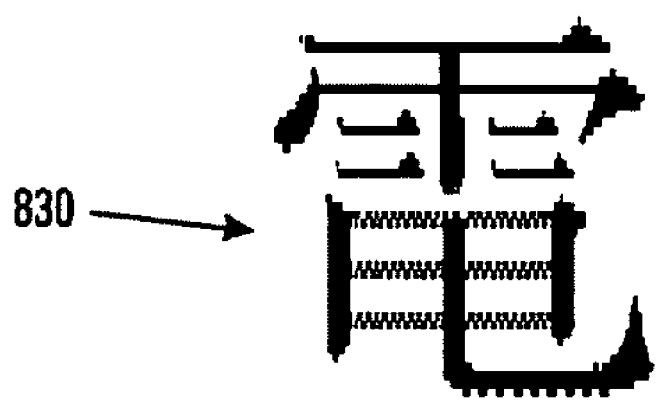

As an illustration of one of the advantages of the present invention, attention is directed to FIGS. 8A-8E. Considering a 1200×1200 dpi binary Kanji symbol shown in FIG. 8A, the symbol contains several thin horizontal lines in area 810. The clustered and dispersed patterns are shown in FIGS. 8B and 8C, respectively. In each case, six line segments straddled two consecutive 600 dpi rasters. In-phase and out-of-phase patterns appeared randomly. On one ROS marking engine, objectionable results were observed because the single raster lines and pulsed lines developed differently; in 8B the clustered rendering technique created lines in region 814 with insufficient density, and they appeared as dotted lines instead of solid lines. In FIG. 8C the dispersed lines exhibited severely reduced density as indicated in region 818, but they did develop as solid lines. In FIG. 8D the phase of the dispersed pattern was carefully arranged into the out-of-phase configuration, and increasing the pulse width reduced development bias. The only problem with region 824 in FIG. 8D was that the dispersed pattern caused the bottom stroke to exhibit excessive development. As a result, the final choice of rendering technique was chosen to be the technique shown region 830 in FIG. 8E where 600 dpi (clustered) half-biting is used when a bottom stroke is identified by the pattern matching look-up table.

In recapitulation, the present invention is a method and apparatus for processing a digital image to alter the darkness thereof. The method and apparatus include isolating regions of the digital image using regions and buffers to determine image context wherein said regions include a plurality of imaging areas suitable for altering darkness thereof, and extracting image data for the areas in at least one region. Using the extracted image data for a region, modified image data is produced using a plurality of look-up tables to produce modifying data associated with at least one imaging area in the region to alter the darkness of said region. The modified data is then merged with the digital image to produce an output digital image having at least one region in which the darkness of the image is altered.

It is, therefore, apparent that there has been provided, in accordance with the present invention, a method and apparatus for altering the darkness of an image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for processing a digital image to alter the darkness thereof, including:
    isolating regions of the digital image wherein said regions include a plurality of image areas, said regions including those suitable for altering the darkness thereof, and extracting image data therefrom for the areas in at least one of said regions, wherein isolating regions of the digital image including those suitable for altering the darkness further includes applying extracted data from said region to a plurality of stages of chained look-up tables to summarize a plurality of corners in a first stage and to summarize patterns surrounding a center image area in a second stage to determine if a matching entry is present;
    using the extracted image data for said region, in conjunction with output from said chained look-up tables, producing modified image data by modifying data associated with at least one area in the region to alter the darkness of said region; and
    merging the modified image with the digital image to produce an output digital image having at least one region in which the darkness of the image is altered.

2. The method of claim 1, wherein isolating regions of the digital image including those suitable for altering the darkness further includes:
    buffering the extracted data from said region; and
    applying the extracted data in a buffer to a look-up table to determine if a matching entry, corresponding to the data, is present.

3. The method of claim 2, wherein producing modified image data by modifying data associated with at least one imaging area in the region to alter the darkness of said region, further includes modifying data associated with at least one imaging area in the region, wherein the modified data is associated with an imaging area near a center of said region.

4. The method of claim 2, wherein buffering the extracted data from said region, further includes selecting only a subset of data from imaging areas in said region.

5. The method of claim 1, further comprising:
    using the extracted image data for said region, producing second modified image data by modifying data associated with at least one imaging area in the region to alter the darkness of said region; and
    combining the modified image data and the second modified image data to produce data to be merged with the digital image to produce an output digital image having at least one region in which the darkness of the image is altered.

6. The method of claim 1, wherein chained look-up tables are arranged so that the output of at least one of the plurality of look-up tables is provided as an input to a subsequent look-up table.

7. The method of claim 1, further comprising delaying an output of at least one look-up table prior to inputting the output into a subsequent look-up table.

8. The method of claim 1, wherein producing modified image data by modifying data associated with at least one area in the region to alter the darkness of said region includes passing extracted image data to a propagation look-up table, where a previous state and the output from a stage of the chained look-up tables are used to produce the modified image data.

9. A method for processing a digital image to alter the darkness thereof, including:
    isolating regions of the digital image wherein said regions include a plurality of image areas, said regions including those suitable for altering the darkness thereof, and extracting image data therefrom for the areas in at least one of said regions, wherein isolating regions of the digital image including those suitable for altering the darkness further includes applying extracted data from said region to a plurality of chained look-up tables to determine if a matching entry is present, and further including applying extracted data from said region to at least one look-up table, and where the look-up table comprises bit vectors for output, said bit vectors being combined by a logic operation to produce a logical value; and
    said logical value being provided to a subsequent look up table to cause a modification of data in the region;
    using the extracted image data for said region, producing modified image data by modifying data associated with at least one area in the region to alter the darkness of said region; and
    merging the modified image with the digital image to produce an output digital image having at least one region in which the darkness of the image is altered.

10. A method for processing a digital image to alter the darkness thereof, including:

isolating regions of the digital image wherein said regions include a plurality of image areas, said regions including those suitable for altering the darkness thereof, and extracting image data therefrom for the areas in at least one of said regions; wherein isolating regions of the digital image including those suitable for altering the darkness further includes, buffering the extracted data from said region, wherein the extracted data is represented as an N-bit value, and where the relative order of bits in the N-bit value are prioritized in accordance with the position of their associated imaging areas relative to a center imaging area; and applying the extracted data in a buffer to a plurality of chained look-up tables, where an output of one look-up table is an input to a subsequent look-up table, to determine if a matching entry, corresponding to the data, is present, said chained look-up tables having entries ordered in a manner representative of their priority for modification of the imaging area data so that a relative priority is established for similar patterns based upon the order of the bits of data;

using the extracted image data for said region, in conjunction with output from said chained look-up tables, producing modified image data by modifying data associated with at least one area in the region to alter the darkness of said region; and merging the modified image with the digital image to produce an output digital image having at least one region in which the darkness of the image is altered.

11. The method of claim 10, wherein isolating regions of the digital image is accomplished using a template matching look-up table to generate an index address, and where producing modified image data by modifying data associated with at least one imaging area in the region is accomplished by using the index address to access an appearance tuning look-up table and output the modified data.

12. The method of claim 11, further comprising outputting the modified data to a pulse-width, position-modulated output control to define the position and width of the modified imaging area to be rendered, where a first plurality of bits in the modified data defines the position and where a second plurality of bits in the modified data defines the width of an output for the imaging area.

13. The method of claim 12, wherein the first plurality of bits determines the position selected from the group consisting of:
left justified;
right justified;
center justified; and
split and justified to left and right.

14. The method of claim 11, further comprising adjusting the appearance tuning look-up table in accordance with a preferred processing mode.

15. The method of claim 14, wherein the preferred processing mode is selected in accordance with a user-specified preference.

16. The method of claim 11, further comprising driving a raster output device in accordance with the modified data.

17. The method of claim 10, wherein applying the extracted data in a buffer to a look-up table includes inputting the extracted data to at least a first stage of a plurality of look-up tables to obtain at least one output.

* * * * *